Jan. 22, 1963  G. A. H. VON ELM  3,074,696
BEVERAGE MIXING DEVICE
Filed Dec. 26, 1961  2 Sheets-Sheet 2
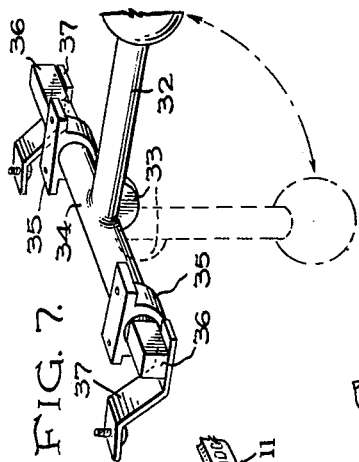
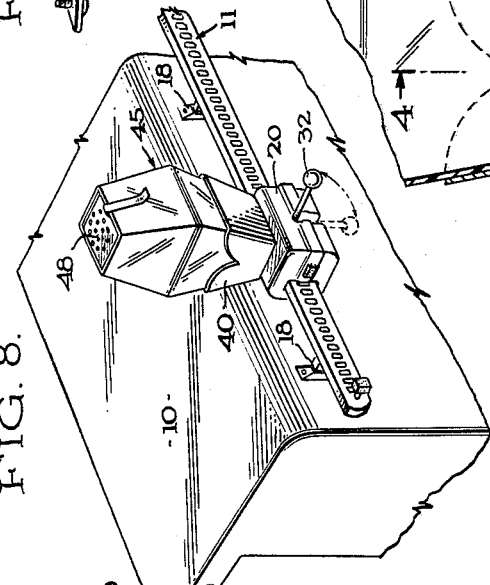
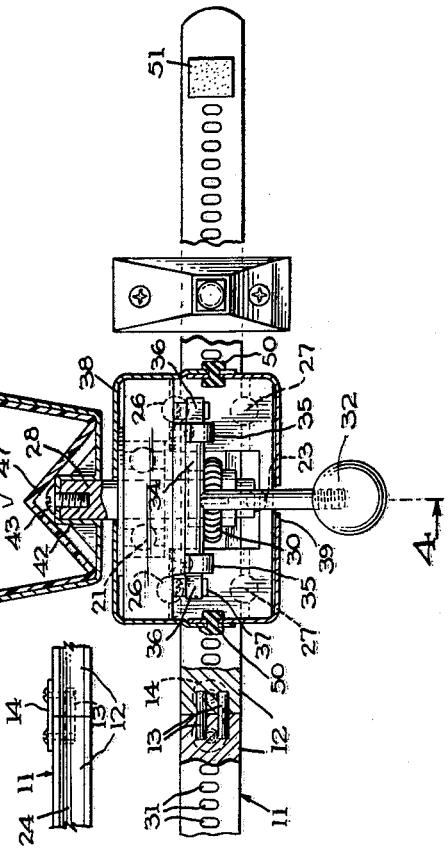
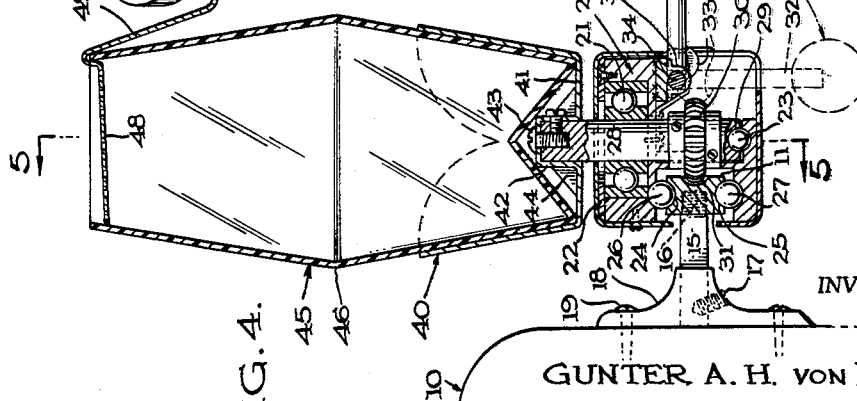
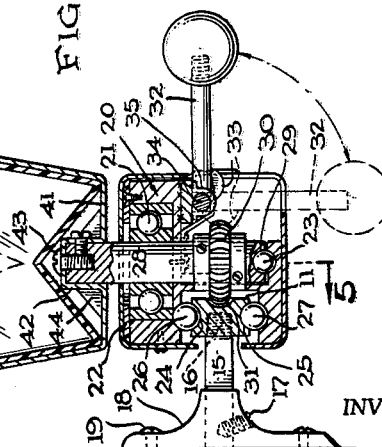
INVENTOR
GUNTER A. H. von ELM
BY B. P. Fishburn, Jr.
ATTORNEY

United States Patent Office 3,074,696
Patented Jan. 22, 1963

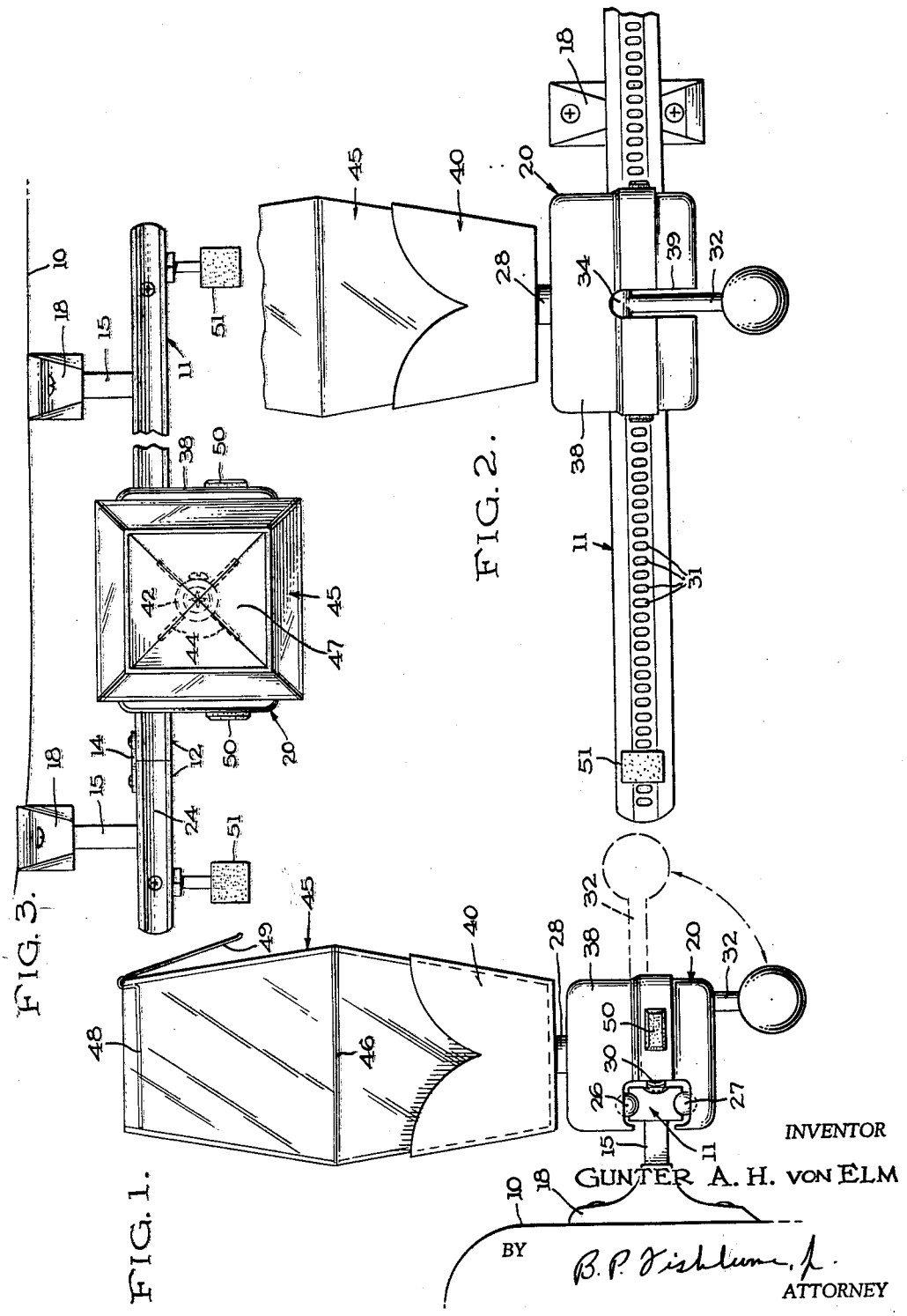

3,074,696
BEVERAGE MIXING DEVICE
Gunter A. H. Von Elm, 107 Hudson St., Hoboken, N.J.
Filed Dec. 26, 1961, Ser. No. 162,002
9 Claims. (Cl. 259—72)

This invention relates to a mixing device for beverages and the like.

An object of the invention is to provide a mixer for cocktails and like beverages which eliminates the necessity for manually shaking the mixing container in the usual manner and provides for thorough and easy mixing of beverages and a considerable saving of time at bars of the commercial or home type.

A further object of the invention is to provide a mixing device of the mentioned character in the nature of a novelty yet completely practical attachment for commercial or home bars or counters.

Another object is to provide a beverage mixer having means to bodily rotate the mixing container as the same is propelled horizontally and longitudinally of the bar or counter.

Another object is to provide a mixing container which is shaped so as to produce thorough mixing of the contents during rotation of the container upon its vertical axis.

Still another object is to provide a beverage mixing device which is sturdy and durable in construction, efficient in operation, highly attractive in appearance and economical to manufacture, install and maintain.

Other objects and advantages of the invention will become apparent during the course of the following description.

In the accompanying drawings forming a part of this application and in which like numerals are employed to designate like parts throughout the same, FIGURE 1 is an end elevation of a beverage mixing device according to the invention, FIGURE 2 is a fragmentary side elevation of the same, FIGURE 3 is a fragmentary plan view of the mixing device, FIGURE 4 is a central vertical section taken substantially on line 4—4 of FIGURE 5, FIGURE 5 is a fragmentary vertical section through the device taken substantially on line 5—5 of FIGURE 4, with parts in elevation and additional parts broken away and in section, FIGURE 6 is a fragmentary plan view of the mounting rail shown in FIGURE 5, FIGURE 7 is a fragmentary perspective view of a locking handle and associated elements, FIGURE 8 is a fragmentary perspective view on a reduced scale showing the invention applied to a bar or counter.

In the drawings, wherein for the purpose of illustration is shown a preferred embodiment of the invention, the numeral 10 designates a fragmentary portion of a bar or counter such as the rear upper portion of a cocktail bar in a restaurant or cocktail lounge or in the home. The bar or counter 10 may be of any desired length and the beverage mixing device according to this invention is adapted to be installed as an accessory to substantially any bar or counter, as will be apparent.

An elongated horizontal guide rail or track 11 extends longitudinally of the bar 10 near the top thereof for any desired distance and may extend for the full length of the bar or a substantial portion of the length thereof. The track 11 is preferably sectional, comprising a plurality of longitudinal sections 12 having their abutting ends doweled together as at 13, FIGURE 5, and further rigidly connected as by connector plates 14 at one side of the track 11 spanning the meeting ends of the individual sections 12, FIGURE 6.

The track or rail 11 is supported adjustably at a number of longitudinally spaced points by short horizontal pins or shafts 15 having screw-threaded engagement at 16 within openings in the rear side of the track 11. The pins 15 are securely anchored as at 17 within openings of brackets 18, which are rigidly secured at 19 to the bar or counter 10.

A carriage 20 is provided for movement along the horizontal track 11 and this carriage preferably comprises a block-like body portion having a top recess to accommodate an upper ball bearing 21 whose rotational axis is vertical, the ball bearing 21 being retained in its seat by a suitable cover plate 22. At its bottom and in axial alignment with the ball bearing 21, the carriage is provided with a frictionless thrust bearing or ball element 23 as shown, for a purpose to be described.

The upper and lower longitudinal sides of the track 11, FIGURE 4, are provided with continuous longitudinal grooves 24 and 25, receiving rollingly frictionless ball bearing elements 26 and 27, seated within spherically curved recesses of the carriage body portion, FIGURE 4.

A short vertical spindle 28 is mounted for rotation in the upper ball bearing 21 with its lower end recessed at 29 for engagement with the thrust bearing element 23. Intermediate the ends of the spindle 28 and adjacent the track 11, the spindle carries a gear 30 rigidly secured thereto for rotation therewith on the vertical axis of the spindle, the gear being disposed within an interior chamber of the carriage 20 as shown in FIGURE 4. The teeth of gear 30 are in constant mesh with rack gear teeth 31, milled or otherwise formed upon the forward longitudinal side of the track 11, and which track is substantially enclosed adjacent to the carriage 20 by the internal chamber of the carriage.

When the carriage 20 is propelled manually along the track 11, its weight is borne by the bearing elements 26 and 27 and the spindle 28 is caused to rotate within the frictionless bearing 21, due to engagement of the gear and rack gear teeth.

A vertically swingable short handle 32 projects forwardly of the carriage 20 and has a locking key 33 rigid therewith engageable with the teeth of gear 30 to lock such gear against rotation whenever the handle 32 is swung downwardly to the depending vertical position shown in broken lines in FIGURE 4. The swingable handle 32 is carried by a horizontal cross shaft 34, rigid therewith and journaled for rotation in bearings 35, rigid with the carriage structure 20, below the ball bearing 21 and spaced from the gear 30, FIGURE 4. The cross shaft 34 includes square end extensions 36 integral therewith overlying leaf springs 37, the latter being secured fixedly to the body portion of the carriage 20 beneath the ball bearing 21 and within the internal chamber of the carriage. The leaf springs 37 coact with the square extensions 36 to resiliently position the locking handle 32 in the elevated horizontal position free from engagement with the gear 30 and in the lowered vertical position where the key 33 moves into locking engagement with the gear 30. By this means, the carriage 20 may be securely locked or held stationary relative to the track 11 at any point along the track.

For appearance sake, the carriage 20 has an outer shell or casing 38 of sheet metal or the like suitably rigidly secured thereto and this casing may be chrome-plated to enhance the appearance of the device. The casing 38 is provided in its forward side and lower corner with a slot 39 to accommodate the movement of the locking handle 32 and the casing otherwise encloses and conceals the elements of the carriage 20. Other parts of the device including the track 11, handle 32, brackets 18, etc. may also be chrome-plated or the like to enhance the attractiveness of the device.

A mixing receptacle holder 40 formed of chrome-plated sheet metal or the like is provided atop the spindle 28 for rotation therewith. This holder is open at its top and rectangular in horizontal cross section and downwardly tapering and includes a horizontal bottom wall 41 having a central upwardly formed and downwardly opening socket 42 receiving the upper portion of spindle 28 snugly.

The holder 40 is detachably rigidly secured to the spindle 28 as at 43 and the bottom of the holder and the socket portion 42 may be additionally braced as by gusset plates 44 or the like to render the structure rigid.

Disposed removably in the rotary holder 40 is a special mixing receptacle 45 formed of glass crystal, colored glass, plastics material or metal, if preferred. The receptacle 45 is rectangular in horizontal cross section and tapers from its widest midpoint 46 towards its opposite ends in a uniform and symmetrical manner. The top end of the receptacle 45 is open. The lower end of the receptacle embodies an upwardly tapering pyramid-shaped wall 47 which fits over the socket element 42. The particular shape of the mixing receptacle 45 is such that it will thoroughly and completely mix the liquid contents, ice, etc. during rapid rotation with the upright spindle 28 as the carriage 20 is moved along the track 11. The liquid contents during rotation of the receptacle tends to well up or be elevated in a conical mass within the receptacle and when the receptacle comes to rest or when the direction of movement of the carriage 20 is suddenly reversed as it may be at any rate, the elevated conical mass of the liquid collapses and rises again to further the mixing of the ingredients. During rotation upon the vertical axis of the spindle 28, the rectangular tapered receptacle 45 thoroughly mixes and agitates the liquid contents in two directions.

The open top of the mixing receptacle may be covered by a suitable removable strainer 48 having the usual supporting handle 49 which facilitates pouring the contents through the strainer after the receptacle 45 is removed from the holder 40. The strainer 48 is rectangular and preferably slightly smaller than the top open end of receptacle 45 so that the strainer will be held securely therein. The strainer is introduced into the top of the receptacle diagonally or across corners due to its oversize construction.

Due to the upward tapering of the top half of the mixing receptacle 45, it has been found that the liquid contents will not splash or spill from the same during rapid rotation of the spindle 28.

In use, with the parts assembled as shown, the liquid ingredients with ice, if preferred, are placed in the receptacle 45 and the latter is placed within the holder 40. The locking handle 32 is elevated to free the gear 30 and the assembly including the carriage 20 is pushed longitudinally of the track 11 for the desired distance or back-and-forth along the track for a short or relatively large distance as found convenient and desirable. This action effects the rapid rotation of the holder 40 and mixing receptacle 45 and the reversal of such rotation when desired, and the contents are thoroughly mixed and agitated in short order. The receptacle is then merely removed from the holder 40 near the end of the bar or at any desired point along the bar and the drink is poured in the usual manner through the strainer 48.

The receptacle 45 and strainer may be readily cleaned or washed at a point remote from the mechanism and there is no tendency for the carriage 20 or track 11 to be soiled during normal operation. However, it is an easy matter to wipe the track, if necessary, and to wipe off the exterior casing 38 of the carriage whenever this is necessary.

As an added feature of the invention, the carriage 20 may be provided upon opposite sides thereof with resilient bumper elements 50 fixedly secured preferably to the casing 38 as best shown in FIGURE 5. Coacting fixed resilient bumpers 51 are suitably fixedly secured to the track 11 near the opposite ends thereof and stand out from the track, FIGURE 3, in alignment with the resilient elements 50. In this manner, the movement of the carriage 20 may be arrested resiliently near the opposite ends of the track as when the mixer is propelled with a push from one end of the track toward the opposite end.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A mixing device for beverages and the like comprising a substantially horizontal track having gear tooth means extending longitudinally thereof, a carriage mounted upon the track for movement longitudinally thereof, a rotary spindle carried by the carriage and being upright and including a gear element engaging the gear tooth means to impart rotation to the spindle when the carriage moves along the track, and a mixing receptacle mounted upon the spindle to turn therewith and to move with the carriage along the track and effecting the mixing of beverages during movement of said carriage.

2. The invention according to claim 1, and means to lock the carriage against movement relative to the track at any selected position along the track.

3. Beverage mixing apparatus comprising an elongated substantially horizontal track adapted to extend lengthwise of a counter, spaced bracket means carrying the track and adapted to be secured to the counter, gear rack means on the track lengthwise thereof, a carriage mounted upon the track and freely movable lengthwise thereof in opposite directions, a rotary spindle mounted upon the carriage to move therewith, a gear secured to the spindle and meshing with said gear rack means of the track, a locking lever pivoted to the carriage and having an element engageable with said gear to lock the same against rotation, a mixing receptacle holder secured to said spindle above the carriage and movable with the carriage and rotatable with the spindle, and a multi-sided beverage mixing receptacle detachably held within said holder.

4. A beverage mixing apparatus comprising a substantially horizontal track, bracket means to support the track upon a bar counter or the like, a carriage engaging the track and freely movable thereon longitudinally of the track in opposite directions, a vertical spindle journaled for rotation upon the carriage and projecting thereabove and including a part rollingly engaging the track to impart rotation to the spindle when the carriage moves lengthwise of the track in either direction, means to lock the spindle against rotation relative to the carriage when the latter is at any position along the track, a holder secured to the top of the spindle to turn therewith and to move with the carriage, and a mixing receptacle for beverages removably seated within said holder and adapted to turn therewith.

5. The invention according to claim 4, and resilient stop means for said carriage mounted upon the track near opposite ends thereof to arrest the movement of the carriage.

6. The invention according to claim 4, and wherein said holder and mixing receptacle are polygonal in horizontal cross section and said receptacle tapers toward its opposite ends from a point of maximum width near the vertical center of the receptacle.

7. A beverage mixing apparatus comprising in combination a support and guide track having grooves in its top and bottom longitudinal sides and gear teeth on one vertical side thereof, a carriage to travel longitudinally of said track and having vertically spaced ball bearing means engaging said grooves of the track to rollingly support the carriage thereon, a vertical rotary spindle on said carriage having a gear engaging said gear teeth, ball bearing means on said carriage rotatably holding said spindle, a cup-like holder secured to the spindle above the carriage and moving with the carriage and spindle, and a multi-sided tapering mixing receptacle detachably mounted within said holder.

8. The invention according to claim 7, a locking handle for said spindle, a rock shaft carrying said handle and journaled upon the carriage and having a square end, a leaf spring secured to the carriage and engaging said square end to releasably position the rock shaft and handle in active and inactive positions substantially ninety degrees apart, and a key element carried by the handle and engageable with said gear of the spindle when the handle is in said active position for detachably locking the gear against rotation.

9. The invention according to claim 7, and wherein said mixing receptacle has an upwardly tapering pyramid-like bottom wall and side wall portions which diverge toward the longitudinal center of the receptacle.

No references cited.